(12) United States Patent
Ryan (10) Patent No.: US 9,100,684 B2
(45) Date of Patent: Aug. 4, 2015

(54) INTEGRATED CIRCUIT WITH SECURE METADATA STORE

(75) Inventor: Tom Ryan, Bristol (GB)

(73) Assignee: STMicroelectronics (Research & Development) Limited, Buckinghamshire (GB)

(*) Notice: Subject to any disclaimer, the term of this patent is extended or adjusted under 35 U.S.C. 154(b) by 1737 days.

(21) Appl. No.: 11/675,530

(22) Filed: Feb. 15, 2007

(65) Prior Publication Data

US 2008/0044020 A1 Feb. 21, 2008

(30) Foreign Application Priority Data

Feb. 15, 2006 (EP) .................................. 06250811

(51) Int. Cl.
*H04N 7/167* (2011.01)
*H04N 21/418* (2011.01)
*G06F 21/72* (2013.01)
*H04N 21/426* (2011.01)
*H04N 21/4623* (2011.01)

(52) U.S. Cl.
CPC ............ *H04N 21/4181* (2013.01); *G06F 21/72* (2013.01); *H04N 21/42623* (2013.01); *H04N 21/42692* (2013.01); *H04N 21/4623* (2013.01)

(58) Field of Classification Search
CPC ......... G06F 12/023; G06F 12/72; G06F 8/60; H04N 21/4181; H04N 21/42692
USPC ................... 380/210, 241; 365/198; 711/163; 714/763
See application file for complete search history.

(56) References Cited

U.S. PATENT DOCUMENTS

| 7,610,329 | B2* | 10/2009 | Bone et al. ..................... 709/201 |
| 2002/0136406 | A1 | 9/2002 | Fitzhardinge et al. |
| 2002/0198864 | A1 | 12/2002 | Ostermann et al. |
| 2005/0177672 | A1 | 8/2005 | Rao |
| 2006/0206536 | A1* | 9/2006 | Sawdon et al. ............... 707/200 |

* cited by examiner

*Primary Examiner* — Brian Shaw
(74) *Attorney, Agent, or Firm* — Seed IP Law Group PLLC (57) ABSTRACT

A semiconductor integrated circuit for processing content data by encrypting or decrypting the data has one or more inputs to received content and metadata. A metadata store comprises two portions, a first portion for storing metadata itself and a second portion for storing an address of locations of bitfields of metadata. This arrangement allows for efficient storage of the metadata but requires certain rules to ensure that bitfields of metadata cannot be stored and used with anything other than the content with which the metadata is associated.

26 Claims, 6 Drawing Sheets

| | E | | O | | C | |
|---|---|---|---|---|---|---|
| 1 | 1,0,2 | V | 3,0,4 | V | 5,0,0 | V |
| 2 | | | | | | |
| 3 | | | | | | |
| 4 | | | | | | |
| 5 | | | | | | |
| 6 | | | | | | |
| 7 | | | | | | |
| 8 | | | | | | |

64 → row 1; 60 = table

| | | |
|---|---|---|
| 1 | A | I1E |
| 2 | C | I1E |
| 3 | D | I10 |
| 4 | F | I10 |
| 5 | G | I1C |
| 6 | | |
| 7 | | |
| 8 | | |
| 9 | | |

| | E | | O | | C | |
|---|---|---|---|---|---|---|
| 1 | 1,0,2 | V | 3,0,4 | V | 5,0,0 | V |
| 2 | 6,0,0 | V | 7,0,0 | V | 8,0,0 | V |
| 3 | | | | | | |
| 4 | | | | | | |
| 5 | | | | | | |
| 6 | | | | | | |
| 7 | | | | | | |
| 8 | | | | | | |

| | 70 | 72 |
|---|---|---|
| 1 | A | I1E |
| 2 | C | I1E |
| 3 | D | I10 |
| 4 | F | I10 |
| 5 | G | I1C |
| 6 | J | I2E |
| 7 | M | I20 |
| 8 | P | I2C |
| 9 | | |

INTEGRATED CIRCUIT WITH SECURE METADATA STORE

BACKGROUND OF THE INVENTION

1. Field of the Invention

This present invention relates to the secure storage of metadata, in particular security related metadata required for decryption or encryption of data such as media content in the form of audio or video data, or the like.

2. Description of the Related Art

The delivery, storage and use of digital data often needs to be controlled so that only authorized recipients may use that data in given ways. This field is Digital Rights Management (DRM) and typically operates by maintaining the data in encrypted form, as far as possible, and to restrict the dissemination of the appropriate "keys" to decrypt the data. Such encrypted data is typically audio or video data and may be referred to as "content" data. The associated data containing instructions (such as keys) on how the content data may be decrypted may be referred to as "metadata". In the example of pay-TV the metadata is broadcast as encrypted control words.

In systems in which content data is received from a broadcast stream, stored, processed to be used (e.g., viewed for video, listen to audio) or distributed to other devices, the content data is typically encrypted using a common encryption scheme. This is because this requires a large bandwidth and it would not be feasible to provide different content data streams to each recipient device. The associated metadata, though, may be encrypted uniquely to each recipient device, as the metadata is a much smaller size.

To maintain security in devices processing content data, the metadata itself is kept in encrypted form until used. At this point, the metadata is decrypted and stored in memory for use by cryptographic processes and any other security related processes such as hardware switches.

BRIEF SUMMARY OF THE INVENTION

We have appreciated that metadata stored in memory in devices for processing content data should be stored in as small a memory as possible to minimize the area on an integrated circuit required whilst maintaining the security of the metadata.

In an embodiment of the invention, the memory for storing metadata is divided into at least two logical or physical parts. A first part, referred to as tier 1, provides addresses of portions of metadata stored in a second part, referred to as tier 2. This allows the tier 2 memory to be designed of an appropriate size to accommodate the likely amount of data based on the feasible use of the metadata and to avoid over capacity. The tier 1 memory requires little space as it simply stores addresses (which are smaller than the metadata itself).

To avoid any security risks being introduced by this division of memory, the embodiment includes rules, which may be enforced through hardware or software to govern the way in which the tier 2 memory may be populated and referenced by the tier 1 memory. In particular, the rules may enforce the integrity of metadata "packages". A "package" being a portion of metadata associated with a given portion of content data. Such rules can enforce that no part of a given package of metadata may be deleted without all other parts being deleted. This prevents, for example, a potential security attack of using a key within metadata for a first stream of content data with a second stream of content data. In a sense, all elements of such a package are kept together.

The appropriate size of the tier 2 memory may include factors such as the fact that not all metadata will be useful to the device. For example, in a set top box embodiment, a particular key may not be needed.

DETAILED DESCRIPTION OF THE INVENTION

A circuit according to one embodiment of the invention is a semiconductor integrated circuit incorporating a memory arrangement. The circuit may be embodied in a variety of content processing devices such as set top boxes, personal video recorders, MP3 players and other audio/video devices. The embodiment described is a video decoder with integrated hard drive storage.

In accordance with one embodiment of the invention, a system processes streams of data and presents these as audio or video (or other content). Each stream of data comprises content data and metadata, which allows the content data to be processed, typically comprising keys to allow the content data to be decrypted. The content data and metadata are transmitted between devices on separate communication channels, but may equally be multiplexed on the same communication channel.

Of importance is that the metadata related to given content data is not open to attack in the sense that secrets such as keys within the metadata are open to access and subsequent fraudulent use. A first mechanism to prevent such access is that the metadata is transmitted in encrypted form between devices and only decrypted when needed and stored for use within memory on the semiconductor integrated circuit. However, the metadata is decrypted before use and stored temporarily in a memory on the integrated circuit. At this point, it is important that the metadata integrity cannot be violated by using portions of the data, such as keys, and that the whole of package of metadata remains associated together and associated with the content data.

Figure 1:
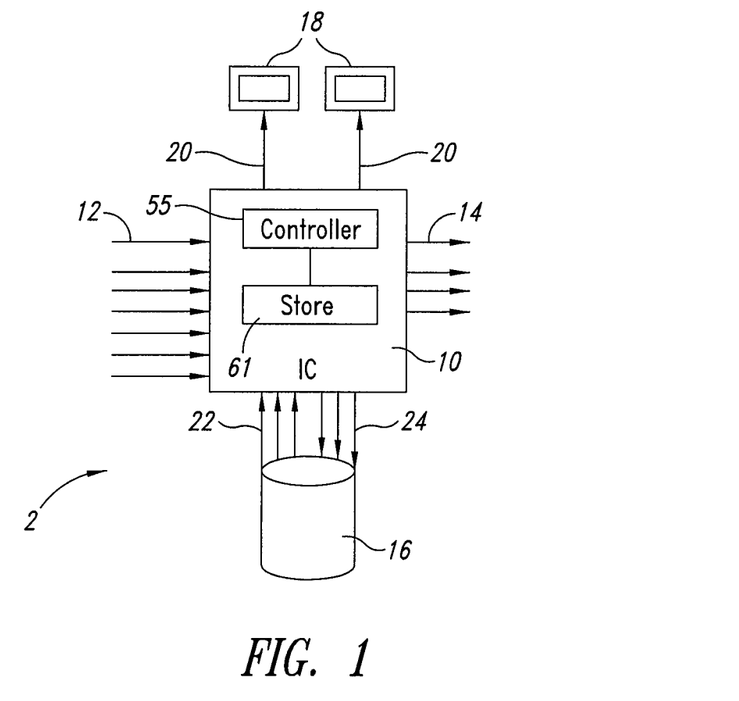
FIG. 1 shows a device including a semiconductor circuit according to one embodiment of the invention.

A device according to one embodiment of the invention is shown in FIG. 1. Such a device may be a set top box (a digital television decoder) or any other content processor device, such as MP3 player, personal video recorder and so on. The device 2 comprises a semiconductor integrated circuit 10, shown schematically, and a long-term storage device in the form of a hard disk drive 16. The circuit 10 can receive and produce a plurality of streams of data including content data (such as audio and video) and metadata (such as keys and switch controls). A first set of inputs 12 comprises streams of content data and metadata received off air from a broadcast transmission (seven such steams shown). A second set of inputs 22 is data from storage. In addition to receiving and processing input data, the circuit can process data either to render the data usable, such as to view video or listen to audio, or to pass the data in encrypted form to another device. A first set of outputs 20 provides usable data to an output device such as a television. A second set of outputs 14 provides data to one or more other devices. Lastly, a third set of outputs 24 provides data to the storage device 16.

The data received off air is decrypted for use. The data passed to storage 16 or to another device by outputs 14 is encrypted so as to ensure control of the content. The usable outputs 20 are preferably analog so as to avoid a stream of content data being "in clear" outside of the semiconductor integrated circuit. The circuit 10 thus provides a high level of security as no digital content data in clear form is exposed outside the semiconductor circuit and, being a monolithic device, it is not feasible to attack the circuit to obtain access to the data present within the circuit.

The inputs and outputs described above are preferably logical, rather than physical, and can be considered as a plurality of streams of input and output content data. For each such stream of content data, associated metadata is needed to allow the content to be encrypted or decrypted. This metadata may itself be a stream of data with changing keys, such as in conditional access television with ECM messages as known to the skilled person, or may be static data in the sense that any keys within the metadata do not change and remain associated with a given portion of content.

The key would be used for retransmission of data, but the content data is to be displayed locally.

The circuit 10 includes a controller 55 and a metadata store 61 that is controlled by the controller 55. The controller 55 could include a software- or firmware-controlled processor or hardwire circuitry that controls writing to and reading from the metadata store. In addition, all or some of the control functions of the controller 55 could be handled by a controller (not shown) that is separate from the integrated circuit 10.

Figure 2:
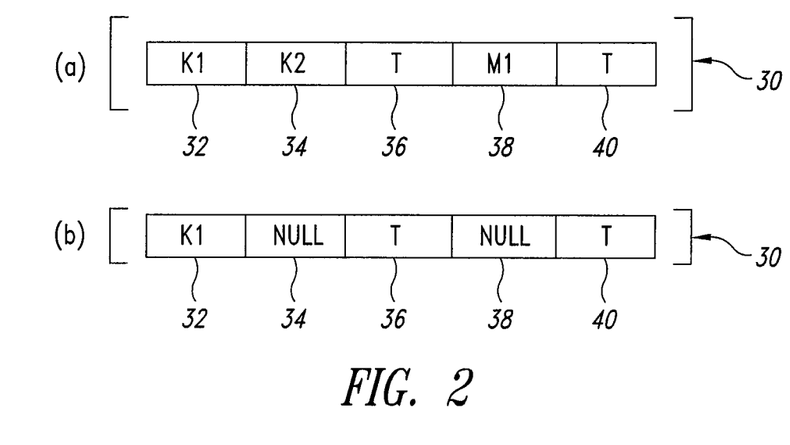
FIG. 2 shows metadata packages.

An example of metadata is shown in FIG. 2 and comprises a bitfield of data referred to as a package 30. In a system in which the metadata is static, there may be one such package associated with a given portion of content data. In a system in which the metadata is a stream of data, there may be a flow of such packages. Two packages 30 (*a*) and (*b*) are shown by way of example. In each package 30, there are bitfields, each carrying data such as a key, timestamp or control switches.

In the package shown, a first bitfield 32 comprises a first key (K1) in both package (a) and (b). A second bitfield 34 comprises a second key (K2) in package (a), but is NULL in package (b). In a third bitfield 36 a timestamp (T) is present in both packages. In a fourth bitfield 38, a miscellaneous (M) data item is present in package (a), this may be a switch instruction, but is NULL in package (b). Lastly, a timestamp (T) is present in a fifth bitfield 40 in both packages. In this example, K2 is a key which is not actually needed by the device because, for example, the key would be used for retransmission of data, but the content data is actually only to be displayed locally.

Figure 3:
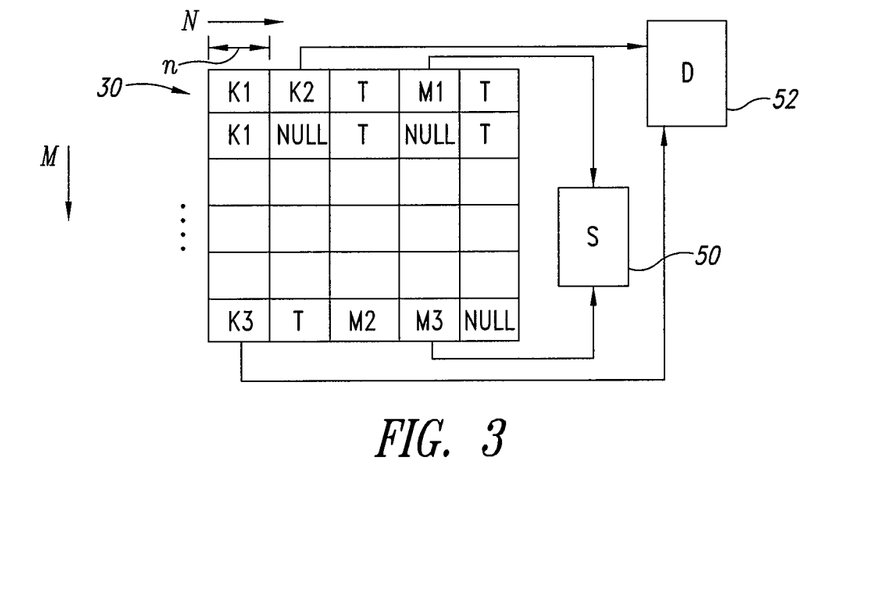
FIG. 3 shows a known way of storing metadata packages for use within a circuit.

As can be seen from this example, the contents of packages within metadata can vary depending upon the purpose of the metadata. Such metadata is stored temporarily in unencrypted form in RAM on a semiconductor before use. A known arrangement for storing this is shown in FIG. 3. Each package 30 is stored in a row of RAM, with each row being N bits in length, this being the sum of the number of bits n in each bitfield. Typically, each bitfield has n=128 bits. As can be seen, there is redundant memory space where 128 bit NULLS are located. At any given moment, many of the packages will have such NULLs meaning that there is needlessly provided redundant memory on the chip. The memory array is used to pass keys to a cryptographic process 52 and switch controls to a switching path 50 as shown. In addition, K2 is needlessly stored and the memory is provided to be large enough to needlessly store such keys.

Figure 4:
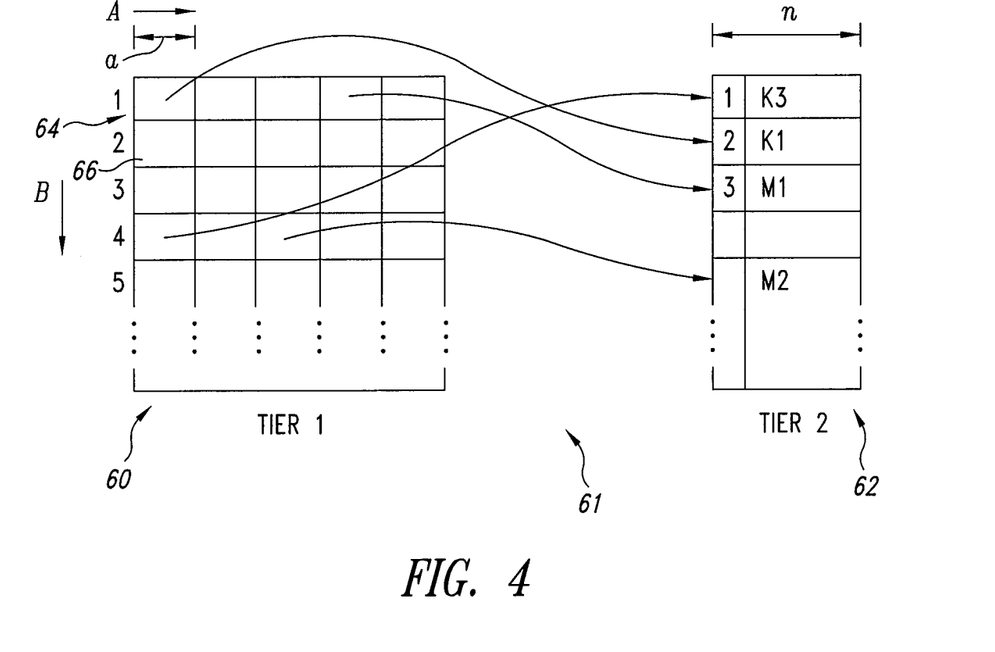
FIG. 4 shows a memory arrangement in a circuit embodying the invention.

The memory arrangement 61 according to one embodiment of the invention is shown in FIG. 4 and comprises two logically or physically divided portions referred to as tier 1 memory 60 and tier 2 memory 62. The tier 2 memory stores the metadata itself, whilst tier 1 memory stores pointers or addresses of where the metadata is stored in the tier 2 memory. These are arranged such that each package 30 has corresponding index locations 64 in tier 1 memory 60. Thus, for each bitfield in a package, there is a corresponding address 66 stored in tier 1 memory. Each address is typically of bit length a=8 bits. The total width A of tier 1 memory is equal to the number of bitfields in a package multiplied by the bit length a of each bitfield address. In the example shown, there are 5 bitfields in each package so the width of tier 1 memory is 5×8 bits=40 bits. The depth of the memory B is the number of packages that may be concurrently stored.

The tier 2 memory stores the metadata bitfields. In contrast to the known arrangement, the width n of the tier 2 memory is the number of bits in each bitfield, here n=128. Thus, each bitfield is stored in a subsequent location in tier 2 memory. The tier 1 memory maintains the addresses where the bitfields comprising each package can be found. Thus, using the same example packages as in FIG. 2, the addresses of a first package (a) are stored in a first row 1 of the tier 1 memory. This shows that: the first bitfield comprising key K1 is stored in location 2 of tier 2 memory; the fourth bitfield comprising miscellaneous data M1 is stored in location 3 in tier 2 and so on. Similarly, the addresses of where data for a second package can be found are stored in tier 1 and point to addresses in tier 2. The way each tier 1 address references the tier 2 memory is shown by arrows in FIG. 4.

The memory saving of this arrangement can now be seen. The depth of the tier 2 memory can be arranged so that it can accommodate the total number of bitfields likely to be needed at any given time. This saves the number of bits in each bitfield multiplied by the number of NULLS that would otherwise be stored. The extra number of bits to be stored in the tier 1 memory only amounts to say 5×8 bits=40 bits for each package. This contrasts to a saving of 128 bits in each package in which there is a NULL bitfield. In addition, the K2 key is not stored and the size of the tier 2 memory is designed so as to avoid being wasted capacity to store such redundant keys.

The size of the tier 2 memory can be determined by the total possible number of concurrent activities. Referring again to FIG. 1, it is noted that this device is shown processing seven input streams 12, three input streams 22, and four output streams 14, three output streams 24 and, lastly, two output streams 20 to televisions 18. In practice, the number of concurrent processes will be limited. So, for example, at any given time, the cryptographic processor might process a maximum of say three each of input and output data streams simultaneously. In consequence, fewer allocated areas of metadata memory than the maximum number of inputs and outputs is required. The saving is further improved by noting that usage rules will mean some content data will not be decrypted and re-encrypted, rather it will simply be passed from the device to another device. In this circumstance, the memory arrangement 61 does not need to store the decryption and re-encryption keys. The general case is thus that the depth of the tier 2 memory only needs to be as deep as the maximum possible concurrent bitfields of metadata that need to be stored.

The general principle of operation so far described thus allows a reduction in the size of memory used to store security related metadata such as keys, switches and other data at the point that it is used. This is particularly applicable to content processing devices that are able to process (decrypt) incoming streams as well as disseminate streams (without decryption and encryption) to others or to encrypt content data to pass to other devices. In this scenario, at any point keys would be required to decrypt, or encrypt or pass on for already encrypted data, but it is not feasible that 3 such keys will be needed for every data stream. In essence, more or less of a given metadata package will be relevant depending upon whether all keys on other data is needed.

The integrity of the metadata is important, in the sense that each package of metadata should remain complete and should only be associated with the correct associated content data. No individual bitfield (such as a key) within the metadata should be separable and usable with anything other than the associated data. Noting that the memory arrangement of FIG. 4 separates the keys into a tier 2 memory, the embodiment includes rules enforced through hardware or software to ensure there is no attack open to access keys in the tier 2 memory or use them for fraudulent purposes.

Figure 5A:
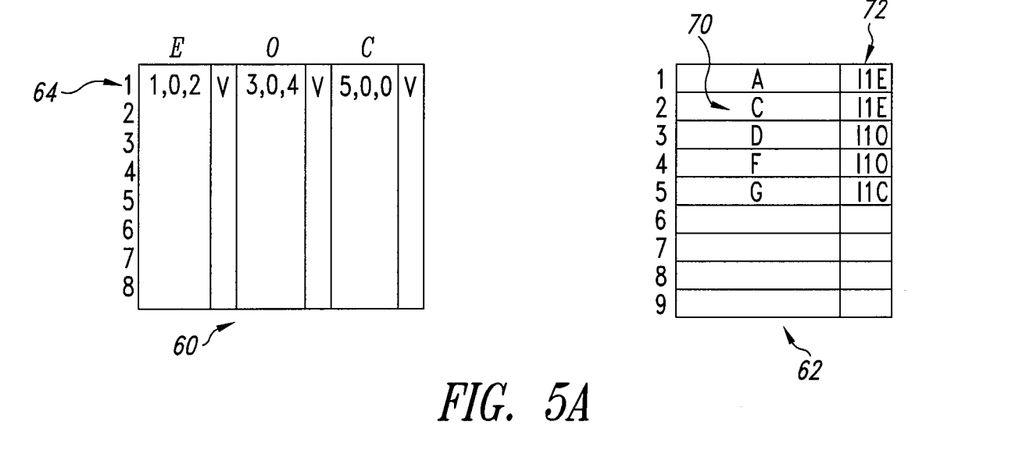
FIG. 5 shows a specific example of writing to a memory arrangement of FIG. 4.
Figure 5B:
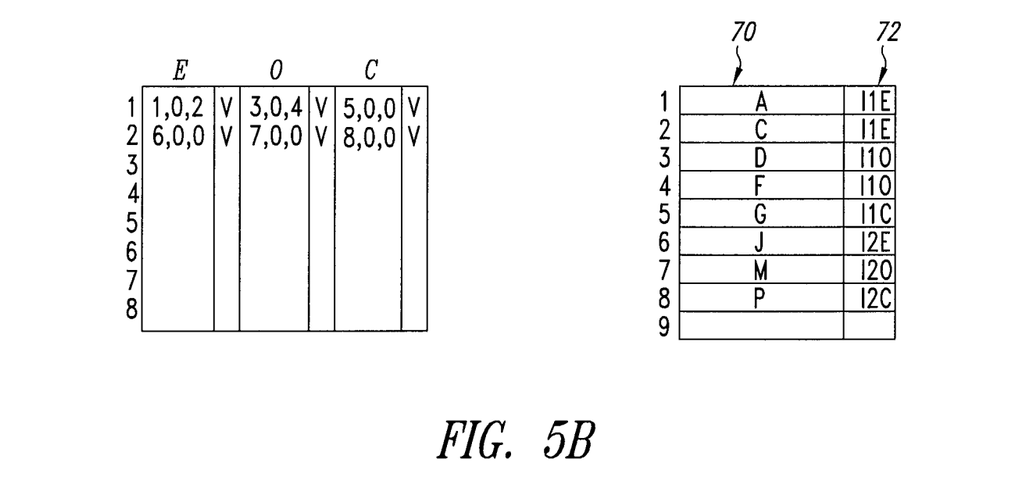
Figure 6:
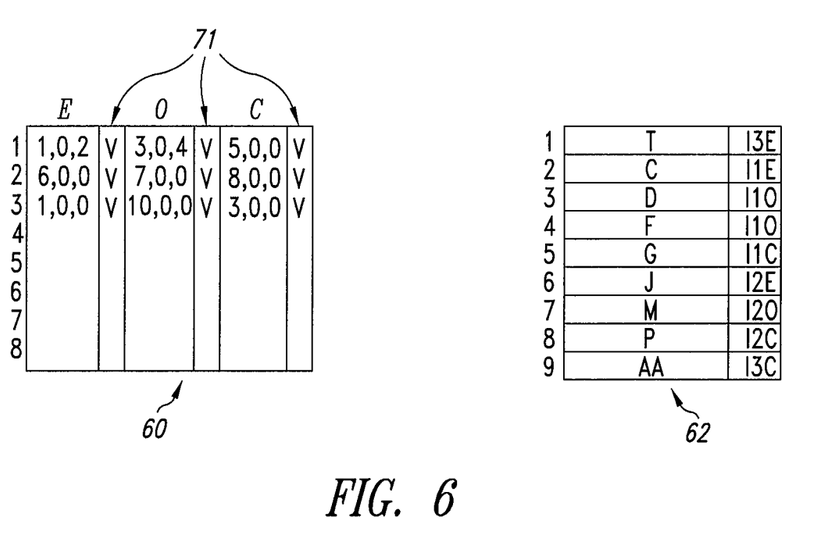
FIG. 6 shows subsequent examples of writing to the memory arrangement of FIG. 4.
Figure 7:
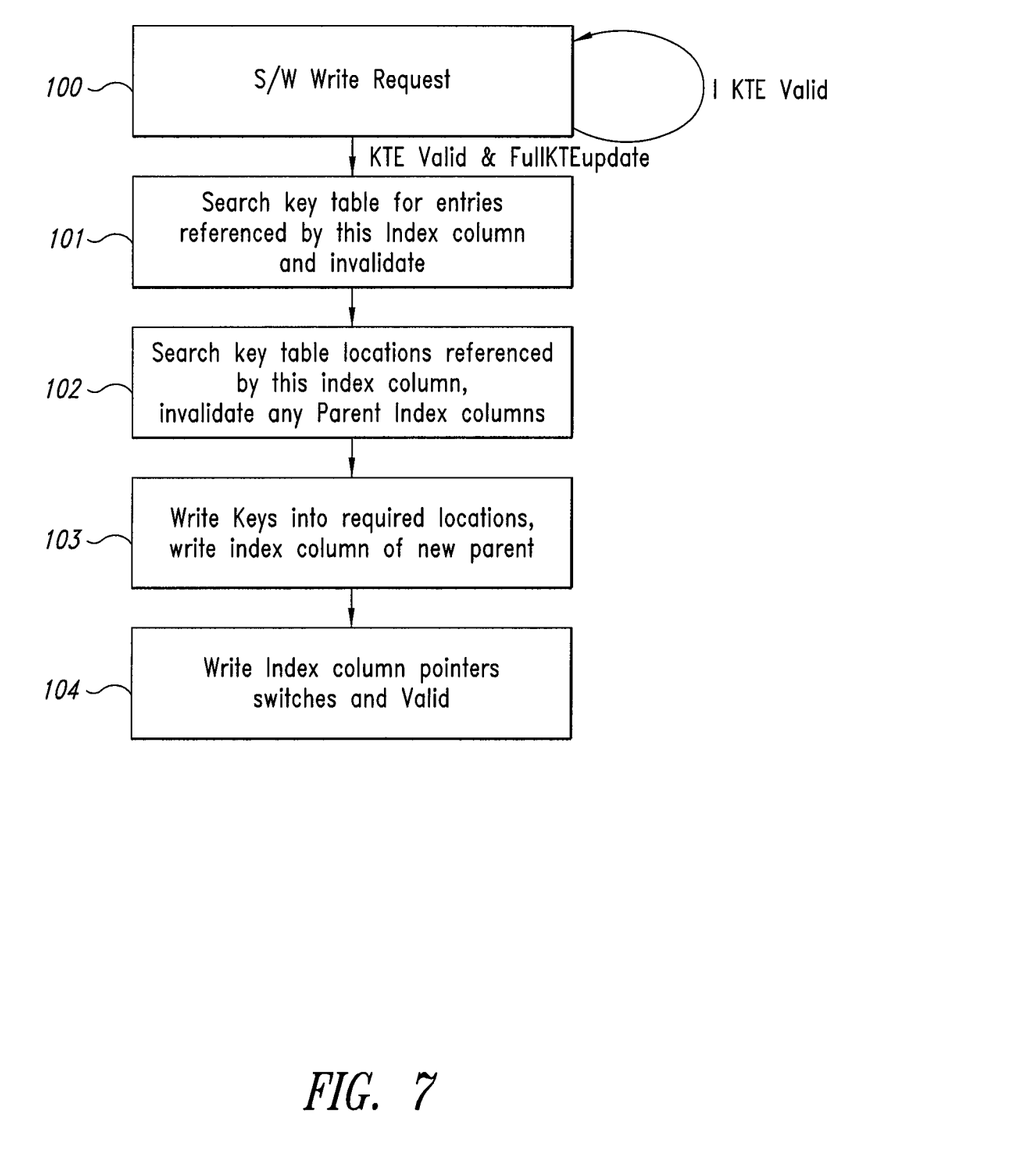
FIG. 7 shows a flow diagram of rules enforced in the writing of data to the memory arrangement.

A specific example of storage of security related metadata in the memory arrangement 61 and the enforcement of rules is shown in FIGS. 5 to 7. The purpose of the arrangement is to decrypt 'messages' containing all possible useful metadata and to store this for use when processing 'content' data. FIG. 5 shows a tier 1 memory 60 and a tier 2 memory 62, these being shown schematically as tables. The tier 1 memory table 60 comprises three main columns referred to as "even" (E), "odd" (O) and "clear" (C). The names are not material and these 3 main columns could be consolidated into a single column within the tier 1 memory. For each package there is a set of addresses in tier 1 pointing to the locations in tier 2 where each bitfield is stored.

Consider a first set of 3 software writes to the memory arrangement with associated metadata outputs to store.

TABLE 1

|  | Write | | |
| --- | --- | --- | --- |
|  | L1E, K1, NULL, K2 | L1O, K3, NULL, K4 | L1C, K5, NULL, NULL |
| Output | A, B, C, S1 | D, E, F, S2 | G, H, I, S3 |

The meaning of the nomenclature is as follows. A first software write to line 1 even (L1E) of the tier 1 memory, writes to location 1 (K1), NULL and location 2 (K2). The security related metadata output that is written comprises bitfields A, B and C and a switch S1. Accordingly, bitfield A written to location 1 of tier 2, bitfield B is not written and bitfield C is written to location 2 of tier 2. In addition to writing the metadata bitfields in the locations 70, the index in tier 1 from which the location in tier 2 is referenced is stored in an address field 72. Thus index 1 even (L1E) is stored adjacent locations 1 and 2 in tier 2.

The next write, line 1 odd (L1O) comprises locations 3, NULL, 4 and metadata bitfields D, E, F. Thus bitfield D is written to location 3, E is not written and F is written to location 4.

The last write, line 1 clear (L1C) comprises location 5, NULL, NULL and metadata G, H, I and so metadata G is written to location 5 only.

S1, S2 and S3 comprise switch data which defines the legal use of data and are 'usage rules' in the sense that they define the manner in which either content or other metadata may be used. These are stored with address data in tier 1 but could equally be stored in tier 2 memory in the same manner as the keys.

There is now a link from the package bitfields to the locations where they are stored in tier 2, and from each location in tier 2 to the index where the addresses are stored in tier 1.

Consider the next software writes as shown in FIG. 5 (*b*).

TABLE 2

|  | Write | | |
| --- | --- | --- | --- |
|  | L2E, K6, NULL, NULL | L2O, K7, NULL, NULL | L2C, K8, NULL, NULL |
| Output | J, K, L, S4 | M, N, O, S5 | P, Q, R, S6 |

The three writes comprise writes to locations 6, 7 and 8 in tier 2 only for bitfields J, M and P respectively. The originating index 72 is also stored alongside each metadata bitfield.

The third three writes illustrate what happens when software reallocates a key slot to a new index column as shown in FIG. 6. Before writing the new index column entry, it searches each location that will be referenced by the new index entry. If they are currently valid and in use, the hardware invalidates the parent index column in tier 1 currently pointing to these key locations in tier 2. It can then replace the keys with the new outputs, store the referencing index and column, update the index table and mark the new index column as valid.

TABLE 3

|  | Write | | |
| --- | --- | --- | --- |
|  | L3E, K1, NULL, NULL | L3O, K10, NULL, NULL | L3C, K9, NULL, NULL |
| Output | T, U, V, S7 | W, X, Y, S8 | AA, BB, CC, S9 |

These last three writes now cause the rules to be enforced to prevent any keys being left in tier 2 memory. The first write line 3 even (L3E) overwrites existing data in location 1 (K1) to replace metadata A with metadata T. At this point, the tier 2 memory 62 contains a key related to the first package written, namely key C at location 2.

In the case above, key location 2 is "orphaned", that is it is left marked as valid but from an invalid index. If a new index 1E entry was created referencing different key locations and marked as valid, it could wrongly be invalidated if another entry tried to point to this orphaned key at location 2. Therefore an additional check is made when writing the valid index entry; that is any keys in locations already referenced by that line are marked as invalid.

Key entry 2 in the example above would therefore not still contain I1E but be marked as invalid.

In the simple case where an odd, even or clear entry is updated, the key entries would be reused. On receiving the write request the hardware would find that the proposed key slots are not orphans (as they would have been checked the first time this binding was made), and move to the next search. It would then find the index column is referenced as the parent already, and it would invalidate the index column. Then the new keys would be written, the pointers rewritten and the column entry marked as valid.

The way that indexes are marked as valid or invalid is using a "valid" flag 71. So, on reallocating a key slot to a new index column, such as reallocating key slot 1 (in tier 2) to index column 3E (in tier 1), key slot 2 (in tier 2) that was previously referenced by index column 1E (in tier 1), now overwritten, must be marked as invalid.

It is important to prevent a valid bitfield being addressed by multiple packages. When writing the address store, a check is made to ensure that the bitfields being addressed are not currently in use.

The address store entries themselves are only validated after all the rules have passed and the bitfields have been written and validated.

The rule enforcement process is shown in FIG. 7. A software write request is issued at step 100, next at step 101, the key table (tier 2 memory) is searched for entries indexed by the requested column and all such entries are marked as invalid (in tier 2 memory). Next, at step 102, the key table (tier 2) is searched for locations referenced by the index column and the parent index column for these (tier 1) is invalidated. The keys are then written to the requested locations and index column of parent is written. Lastly, the index column and pointers are written and marked valid.

Figure 8A:
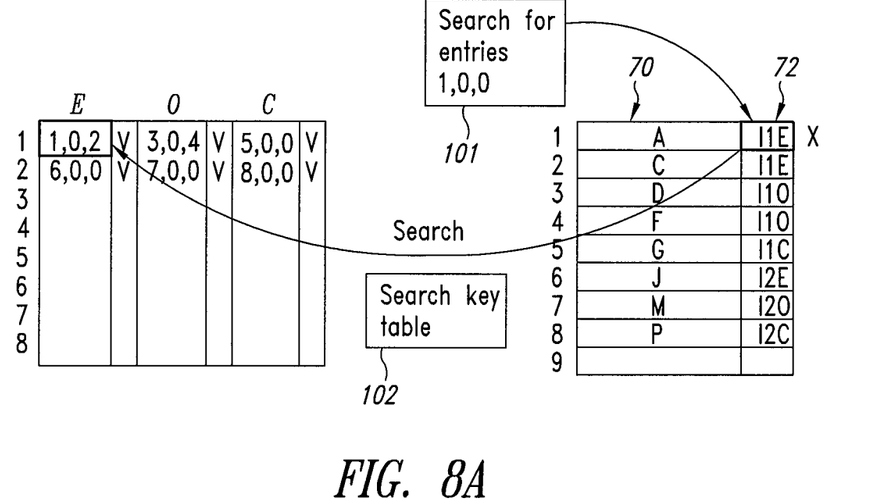
FIG. 8 shows the memory arrangement as the rules are enforced.
Figure 8B:
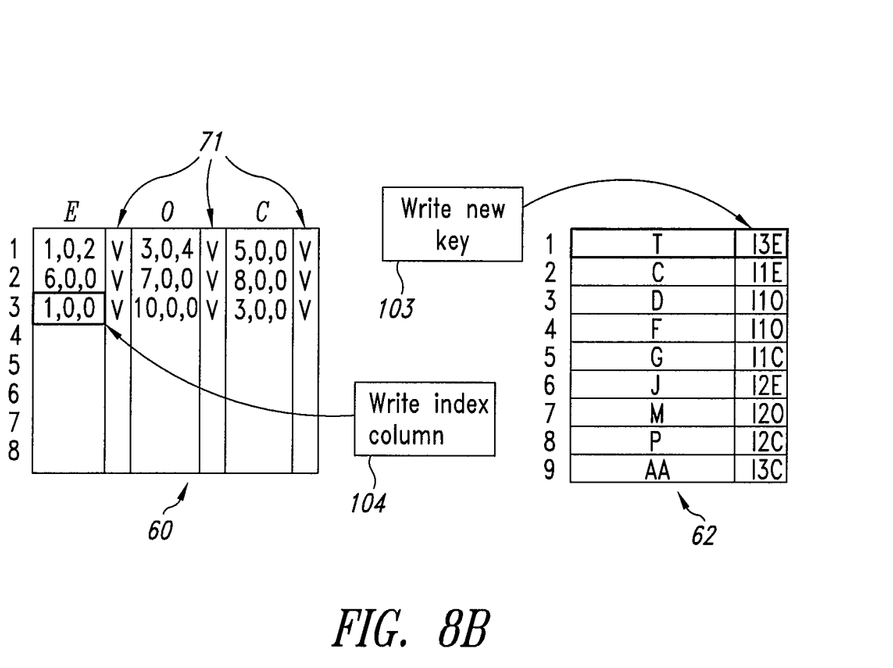

The process is shown on FIGS. 8(*a*) and (*b*), showing how location 1 containing an index column L1E is first marked invalid in step 101, then the key table is searched for any index columns which reference the location I (L1E) and this is marked invalid. Next, the new key T is written and the index column L3E at step 103, and finally the index column is written to tier 1 at step 104. As a consequence, Key C previously referenced as part of package L1E is now marked as invalid in tier 1.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A semiconductor integrated circuit for operating cryptographic processes on content data, comprising:
   one or more inputs arranged to receive content data and metadata, wherein the metadata comprises instructions allowing the content data to be encrypted or decrypted, the metadata including packages each comprising a plurality of bitfields; and
   a metadata store arranged to receive the plurality of metadata bitfields for use by the cryptographic processes;
   wherein the metadata store comprises an address portion and a data portion, wherein the data portion is arranged to store exclusively the metadata bitfields and the address portion is arranged to store exclusively addresses indicating locations of the metadata bitfields within the data portion.

2. A semiconductor integrated circuit according to claim 1, wherein the data portion comprises a memory of width substantially one bitfield and depth appropriate to the number of bitfields to be stored.

3. A semiconductor integrated circuit to claim 1, further comprising a controller structured to store only selected bitfields in the data portion.

4. A semiconductor integrated circuit according to claim 1, further comprising a controller structured to store only selected bitfields of each package in the data portion.

5. A semiconductor integrated circuit according to claim 1, wherein at least some of the bitfields are null, the integrated circuit further comprising a controller structured to not store the null bitfields in the data portion.

6. A semiconductor integrated circuit according to claim 1, further comprising a controller structured, such that if one bitfield of a given one of the packages in the data portion is overwritten, then the controller renders unusable other bitfields of the given one of the packages.

7. A semiconductor integrated circuit according to claim 6, wherein the other bitfields are rendered unusable by being marked as invalid in the data portion.

8. A semiconductor integrated circuit according to claim 6, wherein the other bitfields are rendered unusable by their addresses being marked as invalid in the address portion.

9. A semiconductor integrated circuit according to claim 1, wherein each metadata package is related to specific content data.

10. A semiconductor integrated circuit according to claim 1, wherein the address portion is indexed using information in the content data.

11. A content data processing device for operating cryptographic processes on content data, comprising:
    one or more inputs arranged to receive content data and metadata, wherein the metadata comprises instructions allowing the content data to be encrypted or decrypted, the metadata including packages each comprising a plurality of bitfields; and
    a metadata store arranged to receive the plurality of metadata bitfields for use by the cryptographic processes;
    wherein the metadata store comprises an address portion and a data portion, wherein the data portion is arranged to store exclusively the metadata bitfields and the address portion is arranged to store exclusively addresses indicating locations of the metadata bitfields within the data portion.

12. A content data processing device according to claim 11, wherein the content data processing device is a set top box.

13. A content data processing device according to claim 11, wherein the data portion comprises a memory of width substantially one bitfield and depth appropriate to the number of bitfields to be stored.

14. A content data processing device to claim 11, further comprising a controller structured to store only selected bitfields in the data portion.

15. A content data processing device according to claim 11, further comprising a controller structured to store only selected bitfields of each package in the data portion.

16. A content data processing device according to claim 11, wherein at least some of the bitfields are null, the integrated circuit further comprising a controller structured to not store the null bitfields in the data portion.

17. A content data processing device according to claim 11, further comprising a controller structured, such that if one bitfield of a given one of the packages in the data portion is overwritten, then the controller renders unusable other bitfields of the given one of the packages.

18. A content data processing device according to claim 17, wherein the other bitfields are rendered unusable by being marked as invalid in the data portion.

19. A content data processing device according to claim 17, wherein the other bitfields are rendered unusable by their addresses being marked as invalid in the address portion.

20. A method, comprising:
    receiving metadata corresponding to content data, wherein the metadata comprises instructions allowing the content data to be encrypted or decrypted, the metadata including packages each comprising a plurality of metadata bitfields; and storing at least some of the metadata bitfields in a data portion of a metadata store;

excluding storing in the data portion of the metadata store items other than the metadata bitfields;

storing, in an address portion of the metadata store, addresses of the at least some of the metadata bitfields indicating locations of the metadata bitfields; and excluding storing items other than the addresses of the at least some of the metadata bitfields.

21. A method according to claim 20, wherein storing at least some of the metadata bitfields includes storing only selected bitfields in the data portion.

22. A method according to claim 20, wherein storing at least some of the metadata bitfields includes storing only selected bitfields of each package in the data portion.

23. A method according to claim 20, wherein at least some of the bitfields are null, wherein storing at least some of the metadata bitfields includes preventing storage of the null bitfields in the data portion.

24. A method according to claim 20, further comprising:

overwriting one bitfield of a given one of the packages in the data portion; and rendering unusable other bitfields of the given one of the packages.

25. A method according to claim 24, wherein the rendering unusable step includes rendering unusable the other bitfields by marking invalid the other bitfields in the data portion.

26. A method according to claim 24, wherein the rendering unusable step includes rendering unusable the other bitfields by marking their addresses as invalid in the address portion.

\* \* \* \* \*